United States Patent Office 3,505,830
Patented Apr. 14, 1970

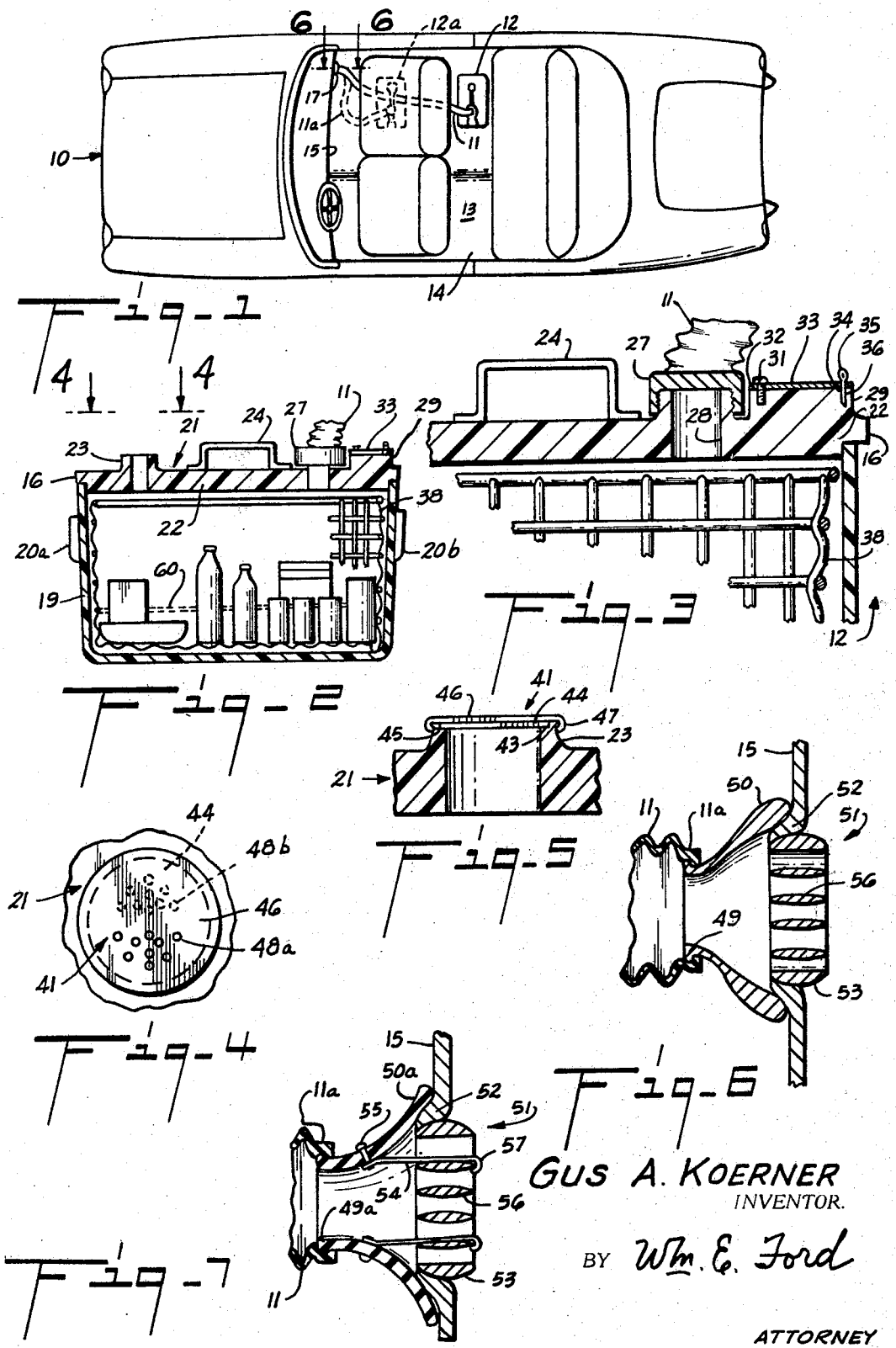

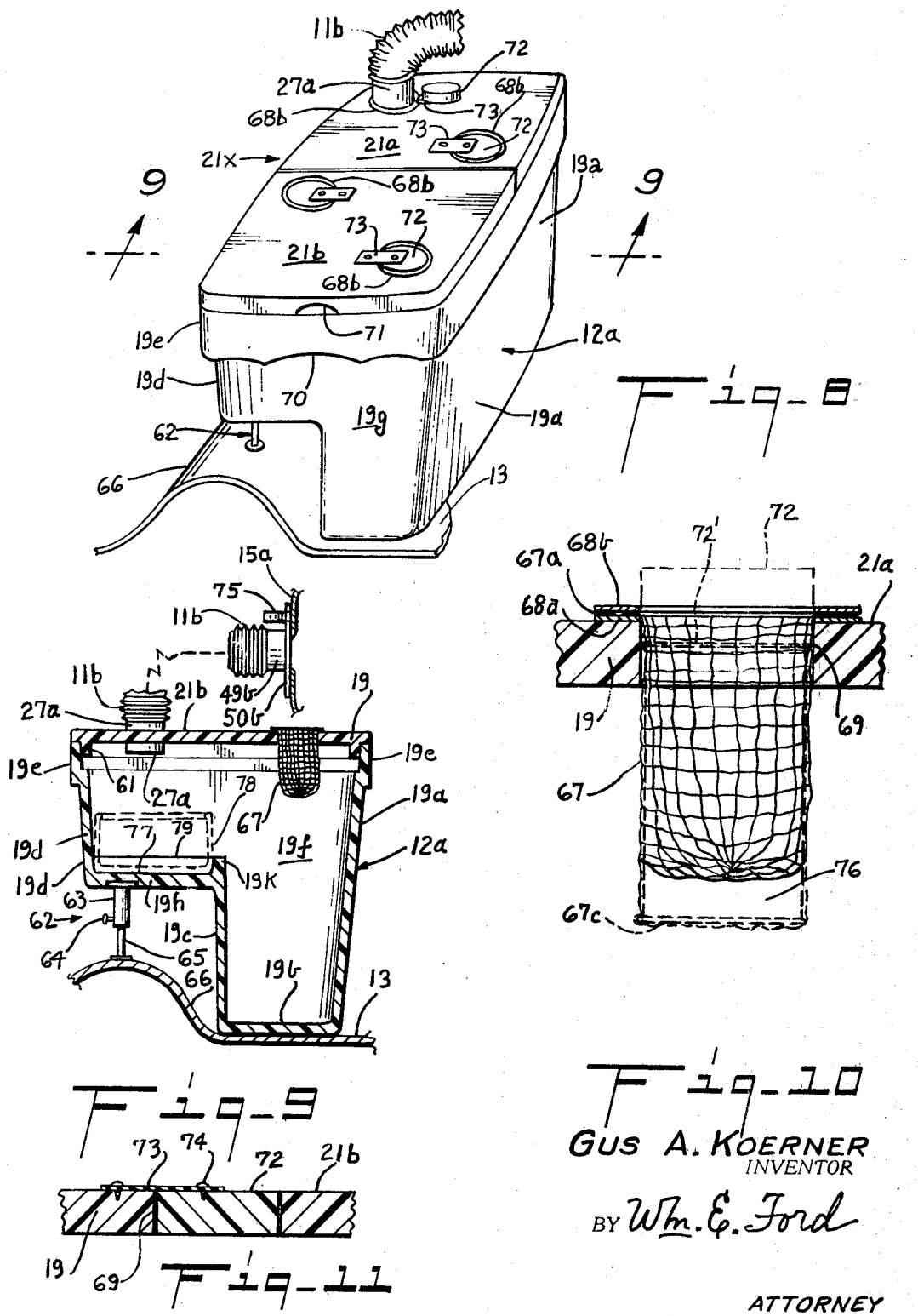

3,505,830
BOX REFRIGERATED BY VEHICLE AIR CONDITIONING
Gus A. Koerner, 4417 Creekbend,
Houston, Tex. 77035
Continuation-in-part of application Ser. No. 638,411,
May 15, 1967, This application Mar. 11, 1969, Ser.
No. 806,104
Int. Cl. F25d 23/12; B60h 3/04
U.S. Cl. 62—337                              14 Claims

ABSTRACT OF THE DISCLOSURE

The disclosure is to a box of insulative material, as styrofoam, to receive therein items to be refrigerated or kept cool. A flexible conduit from an inlet through the lid of the box, has its outer end adapted to engage with the conventional grill in the dashboard of a motor vehicle to communicate with the flow of the vehicle's air-conditioning air. Outlet means in the lid are selectively disposed therein to act as damper means to control the flow of air through the box. Since the flexible conduit is connected to move with the lid while being detachable from the grill, it may accompany the box which is best packed exteriorly of the vehicle and then returned and selectively disposed therein, as under a front seat or in the rear part of the vehicle passenger compartment, the flexible conduit then being engaged upon the grill for the box contents to receive air-conditioned air.

---

The invention relates to an insulative box to carry items, as food and drink, to be kept cool by the cooled air from the air-conditioning system of a motor vehicle, a flexible conduit conducting the cool air to the box and the outlet from the box being controlled by a dampener; this application being a continuation-in-part of application Ser. No. 638,411, filed May 15, 1967, for Box Refrigerated by Vehicle Air Conditioning.

As a primary object the invention sets out to employ the cooled air from a motor vehicle air-conditioning system in cooling products, as food and drink, transported in an insulated box, a flexible conduit connecting the air-conditioning system to the refrigerated box.

It is also another and further object of the invention on file to provide a box refrigerated by the cooled air from a vehicle air-conditioning system, the box being easily connected to a grill in the dashboard, and having an adjustable or dampened outlet to control the rate of air passage through the box.

It is an important and most vital object of the invention added herein as new; in which the dampers as provided, are disposed and counterpoised in manner automatically to achieve desired opening, responsive to rate of air-conditioning air flow in the box.

It is an additional and important object of the invention to provide a refrigerated box of this class which includes a lid as an important part thereof to supply inlet air and outlet air connections, and to serve as closure when the box is to be closed, as when it is connected in service to receive cool air thereinto.

Other and further objects will be apparent when the specification is considered in connection with the drawings, in which; in the pending application:

FIG. 1 is a plan view showing the invention as it may be disposed in alternate positions in the passenger compartment of a motor vehcle;

FIG. 2 is a sectional elevational view through a refrigerated box embedded in one exemplary form of the invention;

FIG. 3 is an enlarged fragmentary, sectional elevational view of the upper right hand corner of the box shown in FIG. 2;

FIG. 4 is a fragmentary plan view of the discharge outlet, as taken along line 4—4 of FIG. 2;

FIG. 5 is a sectional elevational view, taken along line 5—5 of FIG. 4;

FIG. 6 is an enlarged, fragmentary, sectional elevational view of one means of connecting the flexible coolant air conduit to an air conditioning discharge vent into the passenger compartment of a motor vehicle; and FIG. 7 is an enlarged fragmentary, sectional elevational view of an alternative means for making the connection illustrated in FIG. 6.

In the drawings added for the new part of the application, FIG. 8 is an isometric view of a preferred form of the invention in place centrally of a passenger compartment front seat area;

FIG. 9 is transverse section elevation view taken along line 9—9 of FIG. 8;

FIG. 10 is a sectional elevational view through a lid outlet member showing a mesh sack in the opening for receiving a can or bottle of material to be refrigerated; and FIG. 11 is a sectional elevational view through a lid outlet connected to serve as a damper.

Referring now in detail to the drawings of the continuation-in-part of this application in which like reference numerals are applied to like elements in the various views, a motor vehicle 10 is shown in diagrammatic plan in FIG. 1, with a top omitted for clarity. A flexible conduit 11 is shown extending from a refrigerated box 12, disposed on the floor 13 of the vehicle passenger compartment 14, to the vehicle dashboard 15. A fitting or flared flange being indicated as the forward or inlet end 17 of the flexible tube 11, and such fitting or flange will be further described in detail hereinbelow.

Also, in FIG. 1, the refrigerated box 12, shown in full lines to the rear, is shown in dotted lines as disposed in an alternative position 12a under the right front seat 18 of the vehicle 10. This box in alternative position 12a is indicated as being connected by a shorter or contracted conduit 11a to the dashboard 15.

The box 12 is indicated in greater detail in FIG. 2 as having bottom and sides comprised of an insulative plastic, as styrofoam 19. Handling lugs 20a, 20b are shown provided at the opposed ends of the box 12 and a lid 21 has its under face 22 of reduced dimensions and preferably slightly tapered to be urged into the top of the box 12 as the upper part 16 of the lid 21 overhangs the box 12 or rests, as a flange, on the top faces of the walls of the box.

As shown in FIG. 2, the lid 21 has the outlet or discharge boss 23, to be hereinbelow described in detail. Also, from left to right, in FIGS. 2 and 3, the lid 21 has a handle 24, centrally of the lid, an inlet box 25 to the right of the handle 24, and a closure holder boss 26 farthest to the right.

An internally threaded cap flange or fitting 27 is shown on the end of the flexible, accordion type conduit or tubing 11, and threaded upon externally threaded, inlet boss 25, which has the inlet bore 28 centrally therethrough. The boss 29, outwardly of the boss 25, has a lug 30 extending inwardly toward the boss 25, and a pivot screw 31 is threaded thereinto to receive therearound the end portion or lug 32 of a closure disk 33 which seats on top of the round portion of the boss 29, when the disk 33 is not disposed to close the inlet bore 28. The disk 33 has a hole 34 therethrough through which extends a latch pin 35 and into an anchor hole 36 in the boss 29. When the conduit 11 is removed from the boss 25 the latch pin 35 may be removed from the position shown in FIG. 3 and the disk 33 is pivoted to position over the boss 25 and latched thereover by the insertion of the latch pin 35 through the hole 34 in the disk and into an anchor 37 in the boss 25.

Referring again to FIG. 2, a wire mesh basket 38 is shown having feet or projections 39 to space it from the bottom of the box 12, and being of dimensions in plan slightly to clear the sides of the box 12. Thus items of food and drink, generally designated by the reference numeral 40, may be disposed within the wire mesh basket 38, and spaced from the sides and bottom of the box 12 whereby the cool air delivered into the box by the conduit 11 may more freely circulate over the products 40 to be cooled. Also, plates 60, indicated in dotted lines in FIG. 2, may be provided with cutouts therein to receive the items 40 therethrough as the plates 60 are fitted into the mesh basket 38. Thus the items 40 may be stabilized, as when in transit.

The dampener or discharge adjustment 41 indicated in large scale detail in FIGS. 4 and 5, is disposed over the outlet or discharge boss 23 as best indicated in FIG. 5. The discharge bore 42 is thus counterbored at 43 to provide a seat for the inner, partially perforated disk 44. Then an annular groove 45 is provided around the boss 23 slightly below the top thereof, and an outer, partially perforated disk 46, with recurved rim 47 is installed over the inner disk 44. The outer disk 46 is of sufficient flexibility or pliability that the rim 47 may be fitted all around into the annular groove 45.

The outer disk 46 is shown as having perforations 48a therein, in disposition indicated in full lines, and as shown in FIG. 4 these perforations 48a are all occluded or closed from below, as they overlie the unperforated portion of the inner disk 44. In the meantime the perforations 48b in the inner disk 44, shown opposite the perforations 48a in FIG. 4, are occluded by the unperforated portion of the outer disk 46, and thus shown in dotted lines. Obviously the outer disk 46 may be rotated to bring the perforations 48a, 48b in coincidence, and in desired number up to the fullest outlet area permissible by the pattern provided.

In FIG. 6, the flexible conduit or tubing 11, indicated as being of the accordion type, has its forward end 11a fitted over the neck or outer rim 49 of a magnetized, metallic, flared flange 50 of outer diameter to fit over the largest grill 51 likely to be encountered in conventional automobile dashboards 15 which are comprised of metal. These grills 51 are conventionally adjustable as a unit so as to direct some part, or some substantial share of the air-conditioning air blown over the cooling coils (forwardly, and not shown), to some particular area, as upon the person on the right front seat next to the driver. Thus, when the magnetized, forward end flange 50 of the conduit 11 is positioned to be held by magnetism around the grill 51, thus to channelize the cool air through the grill 51 to the refrigerated box 12, the box 12 then becomes a refrigerator.

An optional forward connection is shown in FIG. 7, in which the forward end 11a of the conduit or tubing 11 is fitted over the neck or outer rim 49a of a plastic flared flange 50a with flared forward end of diameter to fit over the peripheral socket 52 formed in the dashboard 15 to receive the rim 53 of the grill 51 therein. Then, since the flared flange 50a carries latch strips or hook prongs 54 with their rear ends bradded to the flange 50a by brads 55, these hook prongs can be guided through openings between the vanes 56 of the grill 51 so that (with the flange 50a compressed forwardly) the hooks 57 at the forward ends of the latch strips or hook prongs 54 will engage over forward edges of the vanes 56 to latch the flange 50a, comprising the forward end of the conduit 11, to the grill 51, so that the flared forward rim of the plastic flange 50a firmly engages around the socket 52. In this manner the air-conditioning system air may be directed and channelized to pass through the grill 51 and by way of the flexible conduit 11 to the refrigerated box 12.

Referring now in detail to the preferred form of the invention, as shown in FIGS. 8 and 9, a flexible conduit 11b is shown extending from a fitting 27a which upstands from a lid section 21a forming approximately the forward half. FIG. 8, of a lid 21x comprised of the aforesaid forward lid section 21a and a rearward lid section 21b. The flexible conduit 11b terminates in a plain tubular outer end 49b with a connection plate, flange or hook member 50b therearound for the purpose of hooking over, mounting over, or making an interfitting connection with a lug or proper extension member extending from an automobile dashboard 15a corresponding with the dashboard 15 shown in FIGS. 1, 6 and 7.

Referring now to FIG. 11, a closure plug or outlet member 72 is shown fitted into a bore 69 in the lid section 21b, a flexible or pliant hinge member 73 having one end portion connected to the top surface of the closure plug 72 substantially centrally thereof, and the other end portion connected to the adjacent upper or outer surface of the lid section 21b. Referring back now to FIG. 8, the fitting 27a, at the outer end of the flexible conduit 11b, has been fitted into the respective bore 69 therefor in the lid section 21a, while the respective closure plug or outlet member 72 has been removed from its respective bore 69, and flipped over to rest upon the lid section 21a, with the said closure plug resting upon the outer section of the respective hinge 73 therebeneath. Otherwise, the other plug 72 in the lid section 21a, and both plugs 72 in the lid section 21b, are shown in respective lid bores 69, not shown as obscured by respective flanges 68b.

As shown in FIG. 10, an under ring 68a fits around a bore 69 in the lid section 21a, and an upper peripheral ring or overlap 67a, at the top of a mesh sack 67, overextends the under ring 68a, while an aforesaid top ring or flange 68b fits upon the mesh overlap ring 67a and over the under ring 68a. Assembly of these elements may be effected, as by gluing them together. Thus the closure plug 72, provided to close the bore 69, may be thrown back on its hinge, not shown in FIG. 8, as indicated in dotted lines, while a container, as a tin can of fluid 76 or cylindrical plastic bottle filled with a liquid (or solid food), may be inserted downwardly into the mesh sack 67. As the mesh sack 67 is stretchable under the weight of the can or container 76, it will take the dotted line position 67c indicated in FIG. 10 when the can or container 76 is in place therein. Also, as indicated in FIG. 10 by the dotted line 72', the closure plug may be turned over by flipping it with its hinge, not shown, thus to position the said closure plug 72 over the can or container 76 in the mesh sack 67.

The lid 21x, of styrofoam 19, has an indented rim or ledge 61 therearound to fit into the reciprocally indented border or rim 19e about the top of the box 12a. From the upper border 19e, the box 12a tapers downwardly on its right and left sides 19a, 19d, with the box being relieved under its left side to form an elevated half-bottom 19h, the box then continuing downwardly in the form of a left lower side 19c to join the half-bottom 19b for the right portion of the box 12a. The box 12a is completed by the forward and rear ends 19f, 19g which extend downwardly from the rim or border 19e.

An upstanding wall section 19k, above the lower left side wall 19c, extends upwardly, and for the length of the box 12a, from front to rear, to provide a recessed base 77 above the left raised bottom section 19h, so that a basket 78 may be seated therein. Optionally the recessed base 77 may be divided into a forward and rear receptacle area by a cross wall 79, a receive forward and rear baskets 78 therein.

As shown in FIG. 9 a tubular member 63 has a flange upwardly to seat in a recess provided in the under face of the half-bottom 19h, while a bar or smaller tubing 65 is intertelescoped into the lower end of the tubular member 63, with a set screw 64 being provided adjustably to connect tubular member 63 and smaller member 65 in assembly. A base flange or seating member is provided on which the bar 65 seats or is fixedly mounted, and this flange in turn seats upon a cowl 66 forming the cover over the longitudinally extending transmission or conventional drive member of the motor vehicle. In FIG. 9 the right half-bottom 19b of the box 12a is shown seated on the floor 13 to the right of the cowl 66 in the front seat passenger compartment area.

Noticeably, with the flexible conduit 11b delivering refrigerating air into the box 12a, all three of the closure plugs 72 that can be placed in bores 69 will joggle up and down responsive to air passage upwardly therearound in its escape. Thus the weight, shape and assembly of the stop plugs 72 with relation to the refrigerating air may be of importance in regulating air passage through the box 12a.

The lid 21x provides an indentation 71 centrally at the respective front and rear ends of the respective lid sections 21a, 21b to facilitate handling. Also, at forward and rear end, the under sides of the rim 19e are contoured at 70, also to facilitate ease of handling.

The forms of the invention, FIGS. 2 and 3, and FIGS. 8 and 9, are exemplary, and other forms and structures may be employed in the practice of the invention. The basic claim 1 herein is the allowed basic claim of the copending parent application and the dependent claims hereunder cover added features ranging over both forms of the invention.

I claim:

1. A box of insulative material refrigerated by the air-conditioning system of a motor vehicle and comprising lid means for said box fitted into the top thereof and providing a cool air inlet means, and also providing air outlet means, closure means for said inlet means when not connected to the air-conditioning system, a flexible conduit adapted at its inlet end for connection over the air-conditioning grill means in the vehicle dashboard, and adapted at its discharge end for operative cool air inlet means communication, whereby to direct cooled air through said flexible conduit into said box, said box being integrally formed and transportable, thus to be packed if desired exteriorly of said vehicle and then placed in said vehicle for air-conditioning system connection, said lid means also including means adapted to control air passage through said box and to close said box when not connected for cool air passage therethrough.

2. Apparatus as claimed in claim 1 in which said inlet end comprises a magnetized flared flange for installation over said grill in a metallic dashboard.

3. Apparatus as claimed in claim 1 in which said inlet end comprises a flexible flared flange for installation over said grill and having connection hooks inside thereof for engagement with the inner edge of the grill vanes, and disengageable from said vanes when said flexible flared flange is urged in direction of the dashboard.

4. Apparatus as claimed in claim 1 in which said means adapted to control air passage through said box includes a pair of partially perforated disks disposed one upon the other, with full discharge occurring when the perforations in the outer disk are occluded by the unperforated part of the lower disk thereunder.

5. Apparatus as claimed in claim 1, which additionally includes a wire mesh basket disposed within said box in slightly spaced relation from the walls thereof to receive therein products carried to be refrigerated by the vehicle air conditioning system air.

6. Apparatus as claimed in claim 1, in which said lid means includes a boss adjacent cool air inlet means, and on which said closure means for said inlet means is pivotally mounted and to be disposed over said boss when not disposed in cool air inlet means closure.

7. Apparatus as claimed in claim 1, in which said inlet means includes a boss which is externally threaded, and in which said discharge end of said flexible conduit comprises an internally threaded fitting for threaded engagement over said inlet boss.

8. Apparatus as claimed in claim 1, in which said flexible conduit is of the accordion type whereby to connect said box to said grill when said box may be selectively disposed under a motor vehicle front seat, and in the rear portion of the passenger compartment.

9. Apparatus as claimed in claim 1 in which said lid includes a lift handle disposed centrally thereupon.

10. Apparatus as claimed in claim 1 in which said box is provided with spacer plate means having apertures therein shaped to receive various food and drink items therein.

11. A refrigerated box as claimed in claim 1 which comprises an outward portion with a bottom to seat on automobile passenger compartment floor, and an inward portion adapted to be supported over the transmission cowl extending longitudinally of said vehicle, centrally thereof.

12. A refrigerated box as claimed in claim 1 in which the air outlet means from said lid means comprise closure plugs insertable in bores through said lid, and mounted by pliant hinges on the lid top to bobble up and down in respective bores responsive to refrigerative air passage from said box outwardly through said bores, thus automatically to control rate of air passage through said box.

13. A refrigerated box as claimed in claim 12 in which mesh sacks may be supported around said bores to extend downwardly therethrough into said box, selectively to receive containers to be refrigerated thereinto.

14. A refrigerated box as claimed in claim 1 in which the inner side of said box is adapted to be supported above the transmission cowl which extends longitudinally of the vehicle, centrally thereof.

References Cited

UNITED STATES PATENTS

| 2,902,838 | 4/1960 | Nichols | 62—244 |
| 3,166,912 | 1/1965 | Patrick | 62—337 |

WILLIAM J. WYE, Primary Examiner

U.S. Cl. X.R.

62—244, 331, 457